Dec. 28, 1937.   A. H. ULLRICH   2,103,802
APPARATUS FOR SEPARATING IN ONE OPERATION HOLLOW BRICKS FROM
A CLAY ROD OR THE LIKE AND FOR CLOSING SAID BRICKS
Filed July 22, 1935   3 Sheets-Sheet 1
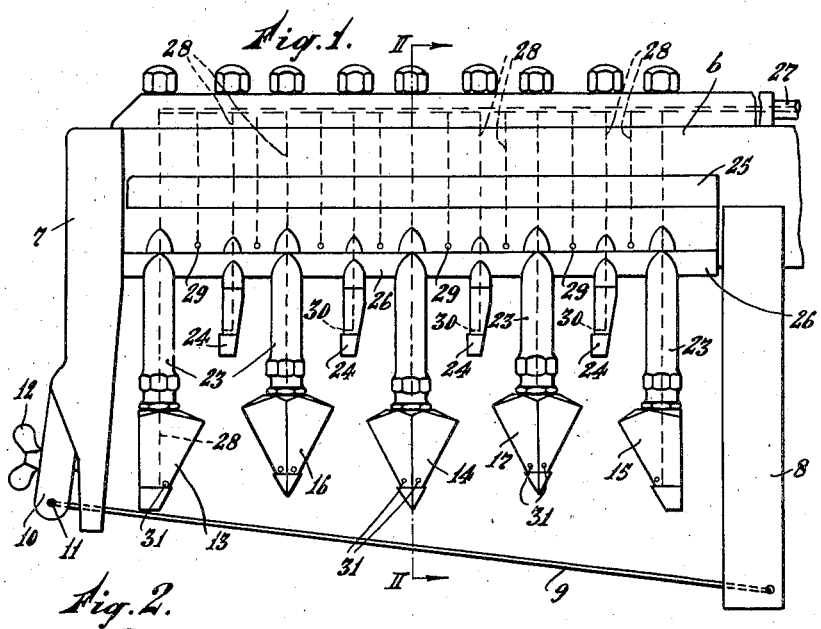
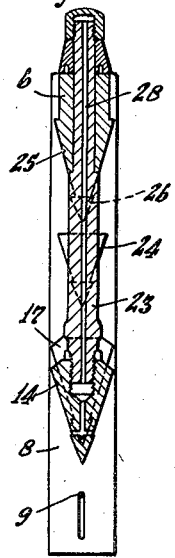
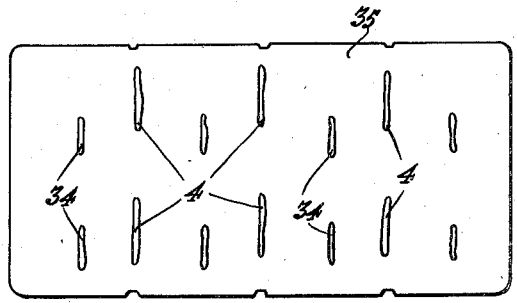
Inventor
A. H. Ullrich
By
C. F. Wenderoth
Atty

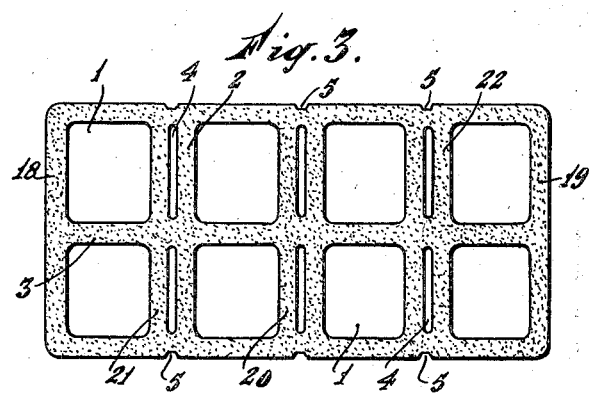
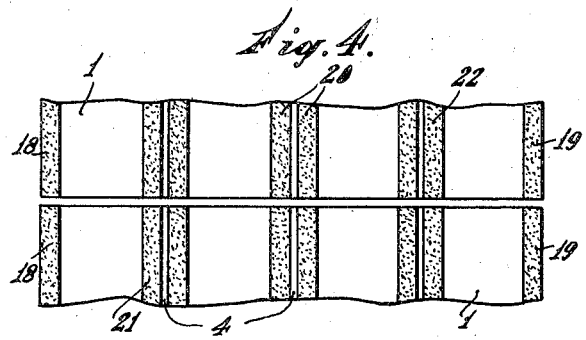
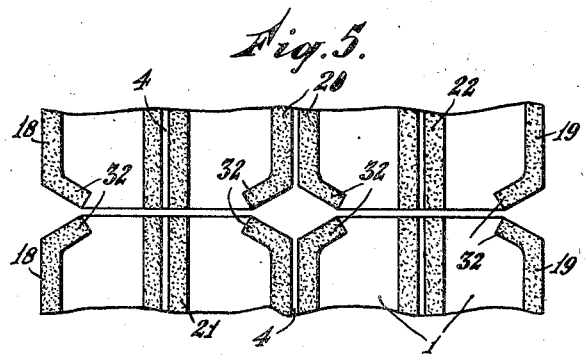

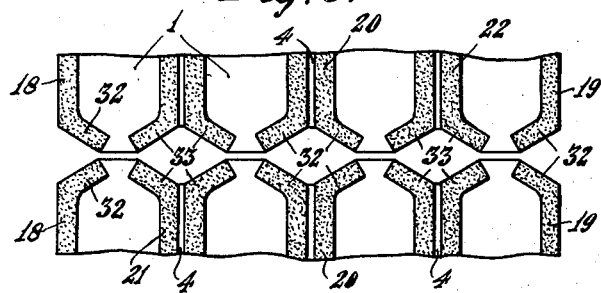
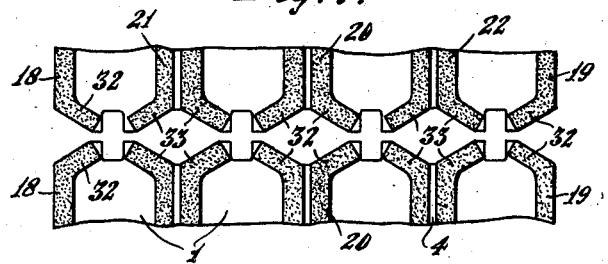
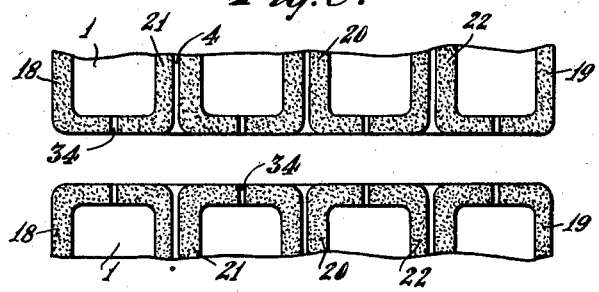

Patented Dec. 28, 1937

2,103,802

UNITED STATES PATENT OFFICE 2,103,802

APPARATUS FOR SEPARATING IN ONE OPERATION HOLLOW BRICKS FROM A CLAY ROD OR THE LIKE AND FOR CLOSING SAID BRICKS

Alfred Heinrich Ullrich, Bandoeng, Java, Dutch East Indies

Application July 22, 1935, Serial No. 32,666
In the Netherlands October 8, 1934

4 Claims. (Cl. 25—1)

In the manufacture of hollow bricks it is already known to effect in one operation the separation of a hollow brick from a rod of clay or like substance and the closing of the brick at one of its open ends while simultaneously closing the opposite open end of the rod from which the brick has separated.

The invention has for its object to provide an apparatus which is of simple construction and reliable in operation and by means of which hollow bricks may be obtained which have very thin walls and consequently but little weight, in which the clay or other substance is distributed as economically as possible throughout the brick and during the closing operation does not penetrate into the brick. A further object of the invention is to provide an apparatus having a large capacity, e. g. 4000 and more bricks per hour, and operating satisfactorily also when inferior kinds of clay are used. When in the foregoing and hereinafter there is a question about bricks and clay it should be understood that the invention is not limited thereto but covers all other substances adapted to be treated in a similar manner and the articles made therefrom.

According to the invention the apparatus, which may be hand- or mechanically-actuated and may have a reciprocatory swinging or rocking movement about an axis parallel and located in spaced relation to the hollow rod, comprises a cutting member, e. g. a steel wire, cutting through the rod and preceding a plurality of closing pieces of such a shape and arrangement that in the course of the closing movement, i. e. the movement of the closing pieces transversly through the rod, said pieces fold inwardly the upstanding walls at the open end of a brick, separated from the rod by said cutting member, and the upstanding walls at the opposite end of the rod.

Preferably according to the invention the closing pieces are arranged in a plurality of rows located in a common plane (the cutting plane), one row above the preceding one, said rows entering into operation subsequently, the closing pieces of one row and those of an adjacent row being disposed in staggered relation. This arrangement of the closing pieces in different rows, one row above the preceding one, has the purpose to prevent all of the closing pieces from penetrating simultaneously into the material to be closed. This is highly desirable in order to prevent the hollow rod from being pressed in and deformed at the upper side.

Preferably the closing pieces fold inwardly the upstanding brick walls only partially, i. e. without entirely closing the bricks, so that under the action of said closing pieces the upstanding wall portions are placed in angular relation to the remaining portion of the upstanding walls, some space being then left between the oppositely located ends of said folded wall portions. The closing pieces may then be followed by a wedge shaped end closing bar arranged parallel to the cutting member and adapted to terminate the folding inward of said wall portions.

According to the invention the row or rows of closing pieces may be followed by one or more rows of knives adapted to cut away some material from the horizontal walls, i. e. the walls located perpendicularly to the cutting plane, at the place where the inwardly folded upstanding wall portions will approach each other. The purpose of the use of said knives consists in the first place in this that from said horizontal walls material is removed to such an extent that sufficient space is formed to enable the partially folded inward upstanding walls to be entirely closed without compressing or deforming the horizontal walls. This has further the advantage that it now becomes possible to form an entirely flat closed surface even with bricks having very thin walls. A further purpose of the use of said knives consists in this that between the oppositely located ends of the inwardly folded upstanding wall portions in their final position there may be left gaps or slots serving the double purpose of decreasing the weight of the bricks and preventing a vacuum to be created in the rod which otherwise might collapse; further bricks having said slots can be thoroughly dried and baked, whereby the bricks will become very homogeneous and will have a high strength against compression. The slots, however, are sufficiently narrow to prevent mortar from penetrating into the interior of the bricks.

In order to avoid that particles of clay or the like adhere to the operative parts of the apparatus and in order to highly reduce the friction during the cutting and closing operation, the cutting and closing elements may be provided with liquid passages having their outlets at the exterior surface of said elements.

The liquid may be supplied under pressure to said passages from a common main pipe and the supply may be controlled in such a manner that the water or another liquid is pressed through the passages at the right moment. In order to prevent the outlet openings to become clogged the cutting and closing elements may be provided with a contracted portion, where the outlet openings are located. Said contractions also contribute to a more uniform distribution of the liquid over the closing and cutting surfaces.

The invention will be more fully understood with reference to the accompanying drawings, illustrating it by way of example.

Fig. 1 is a side elevation of a cutting and closing apparatus according to the invention.

Fig. 2 is a section on the line II—II in Fig. 1.

Fig. 3 is a vertical section through a clay rod from which the hollow bricks are to be made.

Figs. 4-9 illustrate the various phases of the cutting and closing operations.

Referring first to Figs. 3-9, it is remarked that in the embodiment chosen as an example, the clay rod is produced in a rod-forming press having a particular mouth piece whereby hollow cavities or passages are formed in the rod. In Fig. 3 the passages are denoted by 1. They are separated from one another by vertical and horizontal partition walls 2 and 3 respectively. Further slot-shaped passages 4 are formed in the vertical walls 2, said passages allowing the bricks to be hewn later on into pieces, each forming a closed hollow brick.

In the upper and lower side of the rod grooves 5 are formed where the blows for hewing the bricks into pieces may be imparted to the bricks.

As soon as the rod has been sufficiently projected from the rod-forming mouth piece of the press a brick is separated from the rod by means of the cutting and closing apparatus according to Figs. 1 and 2. This apparatus is double-acting, i. e. it closes simultaneously one open end of the brick separated from the rod and the oppositely located open end of the rod itself. At the following cutting and closing operation a separated brick which during the preceding operation has already been closed at the end which then constituted the end of the rod, is closed at the other end, etc.

The apparatus illustrated comprises a frame, composed of a lever 6 to which two lever-arms 7 and 8 are secured perpendicular thereto. The lever 6 carries the closing-device proper, whilst between the lever-arms 7 and 8 a steel-wire 9 has been tensioned, forming the cutting-member, preceding the closing-device. The tension of the cutting wire 9 may be regulated by means of a lever 10, pivotally secured to the lever-arm 7, to which lever 10 one end of the cutting wire is attached at 11. The lever 10 carries a set screw 12 cooperating with the lever 7. The cutting wire 9 has been placed under an incline in order to gradually cut through the hollow rod during the downward swinging movement of the apparatus. This movement may be obtained by pivotally mounting the lever 6 upon a shaft (not shown) arranged in parallel relationship to the rod at some distance therefrom so that in the cutting and closing operation the lever-arms 7 and 8 will straddle the rod. The latter rests on a support (not shown), which is interrupted at the place where the cutting wire cuts through the rod.

The closing device proper comprises in the embodiment shown one row of three closing pieces 13, 14 and 15 and a second row of two closing pieces 16 and 17, the first mentioned row preceding the latter one. The number and arrangement of the closing-pieces depend from the shape of the bricks to be made and of the number of passages in the hollow rod. The closing pieces serve to partially fold inwardly the upstanding rod walls and thereby partially close the passages in the rod. The closing pieces 13 and 15, located at the ends of the lowermost row, cooperate with the outer upstanding rod walls 18, 19, in the manner shown in Fig. 5, while the central closing piece 14 of said row cooperates with the central partition wall 20 of the rod. The closing pieces 16 and 17 of the next row cooperate with the partition walls 21 and 22 of the rod and enter into operation after the closing pieces of the first row have already started their work. The closing pieces 13 and 15 each cooperating with a single upstanding wall 18 and 19 respectively, are of semi-pyramidical or other suitable shape, whereas the central closing piece 14 is of pyramidical or double wedge-like shape. The closing pieces 16 and 17 again are of double-wedge-like shape as they cooperate also with double partition walls of the rod. The various closing pieces are each in a removable manner attached to the lower end of a carrying arm 23, which arms 23 are at their upper ends secured to the lower portion of the lever 6. To this member is also secured a row of wedge-shaped knives 24, each located between the arms 23 of a pair of adjacent closing pieces 13, 16; 16, 14; 14, 17 and 17, 15 respectively. In regard to the hollow rod, said knives are arranged centrally of the passages in the rod when cooperating therewith. All of the closing pieces and knives are located in the same plane with the cutting wire as appears from Fig. 2.

The lower portion of the lever 6 referred to above, to which the closing pieces and knives are secured, forms an end-closing bar 25, the lower side of which is wedge shaped at 26, the function of which bar will be described hereinafter.

For the purpose of lubrication a liquid (water) main 27 is attached to the upper side of the lever 6. From this main pipe passages 28 have been branched off leading through the lever 6, bar 25, knives 24, arms 23 and closing pieces 13—17, to the operation surfaces of said bar, knives and closing pieces.

The passages 28, leading to the operative wedge-shaped surface 26 of the bar 25, have their outlets at 29. The passages 28, leading to the operative surfaces of the knives 24, have their outlets at 30 in a contracted portion of said knives. The passages 28, leading to the operative surfaces of the closing-pieces 13—17 have their outlets at 31 in a contraction of said closing pieces.

In operation the hollow rod (Fig. 3) is first cut through by the cutting wire 9 so that in horizontal section (Fig. 4) the upper half of this figure shows one end portion of a separated brick and the lower half the end of the rod proper. In Fig. 5 the closing pieces 13, 14 and 15 of the lowermost row have partially bent or folded inwardly the upstanding outer walls 18 and 19, and the central partition wall 20 of the rod, thereby forming folded inward wall portions 32. In Fig. 6 the closing pieces 16 and 17 of the upper row have partially folded inwardly the upstanding partition walls 21 and 22, thereby forming folded inward wall-portions 33.

In Fig. 7 the wedge-shaped knives 24 have cut away a portion of the horizontal upper and lower walls of the rod, centrally between the folded inward wall portions 32 and 33 of adjacent upstanding walls.

In Fig. 8 the wedge or V-shaped end-closing-bar 25, 26 has completely folded inwardly the wall portions 32, 33 of all the upstanding walls, so as to form a flat surface of one end of the brick and at the oppositely located end of the rod, leaving slots 34 in the closed transverse walls of the passages in the rod. It follows that the shape and arrangement of the closing pieces should be chosen such that the upstanding wall portions 32, 33 do not engage each other in the position according to Fig. 8.

In Fig. 9 the above-mentioned flat surface with slots 34 has been denoted by 35. The slots 34 extend only so far as required to obtain sufficient circulation of air through all the hollow spaces.

I claim:

1. An apparatus for separating hollow bricks from a rod of clay or like material having interior cavities or passages and for closing the cavities or passages of the bricks, in one operation, comprising a cutting member adapted to cut through the rod, a plurality of closing elements for folding inwardly the upstanding walls, said closing elements being spaced a distance corresponding to the distance between the upstanding walls of the rod and being arranged in at least two rows, located above one another in the plane of the cutting member, and rearwardly of said member, the closing elements of one row and those of the next row being disposed in staggered relation, a row of wedge-shaped knife-elements located also in the plane of the cutting member and rearwardly between said closing elements, and a common frame to which all of the closing and cutting elements are attached, said frame being adapted to be moved in the cutting plane.

2. An apparatus according to claim 1, in which said closing elements are arranged and shaped to only partially fold inwardly the upstanding walls of the rod, without entirely closing the bricks, and comprising an end-closing-bar arranged in the plane of the cutting member and adapted to complete the folding inward of said walls.

3. An apparatus according to claim 1 in which said cutting and closing elements are provided with passages for a liquid having their outlets at the interior surface of said elements.

4. An apparatus according to claim 1 in which said cutting and closing elements are provided with passages for a liquid having their outlets at the interior surface of said elements and in which said outlets are located in contracted portions of the cutting and closing elements.

ALFRED HEINRICH ULLRICH.